United States Patent [19]
Ali et al.

[11] Patent Number: 6,044,346
[45] Date of Patent: Mar. 28, 2000

[54] SYSTEM AND METHOD FOR OPERATING A DIGITAL VOICE RECOGNITION PROCESSOR WITH FLASH MEMORY STORAGE

[75] Inventors: Syed S. Ali, Green Brook; Stephen C. Glinski, Edison, both of N.J.

[73] Assignee: Lucent Technologies Inc., Murray Hill, N.J.

[21] Appl. No.: 09/037,329

[22] Filed: Mar. 9, 1998

[51] Int. Cl.[7] ....................................................... G10L 7/08
[52] U.S. Cl. ........................ 704/270; 704/272; 704/231; 704/275
[58] Field of Search ..................................... 704/270, 275, 704/246, 247, 239, 256, 251, 252, 253, 248, 272, 231

[56] References Cited

U.S. PATENT DOCUMENTS

| | | | |
|---|---|---|---|
| 5,127,043 | 6/1992 | Hunt et al. | 379/88.02 |
| 5,687,279 | 11/1997 | Matthews | 704/201 |
| 5,774,859 | 6/1998 | Houser et al. | 704/275 |
| 5,787,445 | 7/1998 | Daberko | 707/205 |
| 5,881,134 | 3/1999 | Foster et al. | 379/88.1 |

OTHER PUBLICATIONS

Iwata et al. IEEE Journal of Solid–state Circuits, vol. 30, Issue 11, pp. 1157–1164, Nov. 1995.

Tae–Sung et al. A3.3 V 128 Mb multi–level NAND flash memory for mass storage applications. Solid–State Circuits Conference, 1996. Digest of technical Papers, 42 nd ISSCC. 1996 IEEE INternational. pp. 32–33 and 412, Feb. 1996.

*Primary Examiner*—David R. Hudspeth
*Assistant Examiner*—Abul K. Azad
*Attorney, Agent, or Firm*—Darby & Darby

[57] ABSTRACT

A system and method for operating a digital voice recognition processor with a non-volatile flash memory unit as the primary storage medium utilizes a wandering buffer scheme to reduce the number of memory writes performed to any portion of the flash memory unit during training and recognition operations, thereby reducing the incidence of the flash burnout effect.

17 Claims, 4 Drawing Sheets

SYSTEM AND METHOD FOR OPERATING A DIGITAL VOICE RECOGNITION PROCESSOR WITH FLASH MEMORY STORAGE

FIELD OF THE INVENTION

The invention relates to a system and method for interfacing a digital audio processor used in voice recognition processing to a non-volatile storage device, and more particularly to a system and method for operating a programmable digital signal processor chip, which is used to sample, process, and recognize a limited set of spoken audio commands, with a flash memory device that can accommodate a limited number of write operations.

BACKGROUND OF THE INVENTION

While practically unheard-of, or considered as science fiction, only a few years ago, automatic electronic voice recognition is now a reality. This technology, while complex, is becoming increasingly popular even in consumer devices.

Digital voice recognition is useful for several reasons. First, it offers a user the possibility of increased productivity at work, as a voice-operated device can be used hands-free. For example, a telephone "voice mail" system that uses voice recognition techniques to receive commands from the user can be operated via a user's voice while the user is looking at other things or performing other duties. Second, operating a device by voice commands is more natural for many people than entering cryptic command codes via a keyboard or keypad, such as one on a telephone. Operating a device by voice may seem slightly unnatural at first, as it is a new technology, but most people have been found to acclimate quickly. Finally, when a device is operated with spoken commands, and the user is addressed via a synthesized voice, there is a reduced need to memorize a complex set of commands. Voice commands can be set up using natural phrases, such as "retrieve messages" or "erase," and not sequences of numeric codes and "*" and "#" symbols, as would be necessary on a traditional telephone keypad.

The increase in the popularity of voice recognition systems has been facilitated by a number of technical advances, as well. Only recently has it become possible for a relatively cost-effective consumer-oriented device to perform a satisfactory level of voice recognition.

Over the last several years, there have been order-of magnitude increases in computer performance. It is now possible for a relatively simple special-purpose digital computer to perform the kinds of mathematical calculations and signal processing operations necessary to accomplish voice recognition in real time. In the past, satisfactory voice recognition called for substantial amounts of processing time above and beyond that required to digitally capture the speech.

There have also been extremely significant decreases in price. Powerful special-purpose digital signal processing computer chips are now available at prices that make real-time voice recognition possible in low-priced consumer articles. The cost of other digital components, particularly memory, has also decreased drastically within the last several years.

Finally, there have also been great improvements and refinements in the signal processing algorithms used to accomplish voice recognition. Much research in this area has been undertaken within the last ten to fifteen years, and the refined algorithms now preferred for voice recognition have only recently been developed.

There are numerous types of voice recognition systems in development and use today. These types can be broken down by several characteristics: the vocabulary size, speaker dependency, and continuous vs. discrete speech recognition.

Large vocabulary voice recognition systems are typically used for dictation and complex control applications. These systems still require a large amount of computing power. For example, large vocabulary recognition can only be performed on a computer system comparable to those typically used as high-end personal or office computers. Accordingly, large vocabulary recognition is still not well-suited for use in consumer products.

However, small vocabulary voice recognition systems are still useful in a variety of applications. A relatively small number of command words or phrases can be used to operate a simple device, such as a telephone or a telephone answering machine. Traditionally, these devices have typically been operated via a small control panel. Accordingly, the functions performed by entering codes on the device's control panel can also be performed upon receiving an appropriate voice command. Because only a small number of words and phrases are understood by such a system, a reduced amount of computer processing capability is necessary to perform the required mathematical operations to identify any given spoken command. Thus, low-cost special-purpose digital signal processor chips can be used in consumer goods to implement such a small vocabulary voice recognition system.

Some voice recognition systems are known as "speaker-independent," while others are considered "speaker-dependent." Speaker-independent systems include generic models of the words and phrases that are to be recognized. Such systems need not be "trained" to understand a particular speaker's voice. However, because of this, a user's unusual accents or speech patterns may result in reduced recognition accuracy. On the other hand, speaker-dependent systems require some level of training. That is, the system requires a user to recite several words, or to speak for several minutes, so that the system can adapt its internal word models to match the user's particular manner of speaking. This approach usually results in improved recognition accuracy, but the necessary training before use can be tedious or inconvenient. Moreover, if multiple users will be using a speaker-dependent system, the device must provide for the storage of multiple user voice models, and each user must train the device separately.

Two final categories of voice recognition systems are those systems capable of recognizing continuous speech and those systems only capable of recognizing discrete speech. Continuous speech recognition is most often useful for natural language dictation systems. However, as continuous speech often "runs together" into a single long string of sounds, additional computing resources must be devoted to determining where individual words and phrases begin and end. This process typically requires more processing ability than would be present in a typical low-cost consumer product.

Discrete speech recognition systems require a short pause between each word or phrase to allow the system to determine where words begin and end. However, it should be noted that it is not necessary for each word to be pronounced separately; a small number of short command phrases can be treated as discrete speech for purposes of voice recognition.

While there are advantages to large-vocabulary, speaker-independent, continuous speech recognition systems, it is observed that several compromises must be made to facilitate the use of voice recognition in low-cost consumer articles. Accordingly, it is recognized that small-vocabulary, speaker-dependent, discrete speech recognition systems and methods are still useful in a variety of applications, as discussed above. Even so, additional compromises are necessary to permit the efficiencies in manufacturing and use that would allow such systems to gain acceptance among consumers.

For example, in most speech recognition systems, large amounts of memory are used for various purposes in the recognition system. Buffers are needed to store incoming sampled voice information, as well as to store intermediate versions of processed voice information before recognition is accomplished. These buffers are constantly written and rewritten during training and recognition processing to accommodate voice input, update voice models, alter internal variables, and for other reasons. In most cases, static random-access memory ("static RAM") has traditionally been used in this application; it will be discussed in further detail below.

The traditional low-cost digital memory devices used in most digital voice storage and recognition applications have a significant disadvantage. When power is removed, the memory contents are permanently lost. For example, the least expensive type of digital memory usable for audio recording and processing is dynamic random-access memory ("dynamic RAM"). Audio grade dynamic RAM, which may be partially defective (and thus not usable in data-storage applications) is known as ARAM. When power is disconnected from ARAM, the memory contents are lost. Moreover, ARAM must be periodically "refreshed" by electrically stimulating the memory cells. For these reasons, a battery backup must be provided to preserve ARAM contents when the device is removed from its primary power source. This is inconvenient for the user and adds bulk and expense to a device that uses ARAM. Moreover, additional circuitry can be necessary to provide the necessary refresh signals to the ARAM.

Despite their disadvantages, ARAM devices are in relatively high demand because of their low price point. Accordingly, ARAM devices are sometimes in short supply, causing their price advantage to be nullified.

Static RAM is also a type of volatile digital memory. Static RAM typically provides very fast memory access, but is also power-consuming and expensive. No refresh signals are necessary, but like dynamic RAM, power must be continually supplied to the device, or memory contents will be permanently lost.

With both of the foregoing types of volatile digital memory, speaker-dependent training data and other vital system information can be lost in a power failure unless battery backup is provided. If speaker-dependent training data is lost, the system must be re-trained by each user before it can be used again. As discussed above, training can be inconvenient and tedious, and it may take at least a few minutes.

Several types of non-volatile memory, or memory that retains its contents when power is removed, are also available. EEPROM, or Electrically Erasable Programmable Read-Only Memory, is expensive in the quantities and densities necessary for audio storage and processing. So-called bubble memory is also available; it, too, is expensive, and is generally too slow for advantageous use in audio applications. Finally, flash memory is available. Traditionally, flash memory has been expensive, and very slow to erase and to write. In recent years, the time required to program flash memory has been reduced, and it is now usable for audio recording and processing systems. However, flash memory is subject to a burnout effect. After a limited number of re-writes to a portion of the storage device, that portion of the device will wear out and become unusable.

The problems inherent in using volatile digital memory can be solved by combining a quantity of non-volatile memory with the usual volatile memory. However, this solution is disadvantageous in that it increases the component count, and therefore increases manufacturing expenses. Separate volatile and non-volatile memory components would be necessary when such a solution is used.

In light of the disadvantages of the various volatile and non-volatile digital storage options for voice recognition processing, there is a recognized need for a low-cost voice recognition system that is capable of using low-cost non-volatile memory for substantially all of its storage requirements. Such a system should be able to accommodate a relatively small vocabulary of commands for the control of an electronic device, such as a telephone answering device. Such a system should also be durable and resistant to memory burnout effects.

SUMMARY OF THE INVENTION

The invention uses a low-cost programmable digital signal processor (DSP) in conjunction with a low-cost flash memory device to provide for digital voice recognition in a consumer device, such as a telephone answering machine. Because flash memory is used, the data stored therein is nonvolatile, and no battery backup or refresh circuitry is required to prevent loss of speaker-dependent training data or other information when a power failure is encountered.

As flash memory is known to exhibit a burnout effect, in which a portion of the device that has been written to a large number of times (typically in excess of 100,000 write operations) eventually becomes inoperative, the invention employs a buffer manipulation scheme to reduce the number of write operations performed on any single portion of the flash memory device, thereby reducing the incidence of the flash memory burnout effect to a level acceptable for a consumer device.

In this scheme, two digital voice buffers are allocated from "scratchpad" memory within the DSP chip. While data from one buffer is being processed for training or recognition purposes, the other buffer continues to receive sampled audio data. The buffers are allowed to completely fill before being processed as necessary by the invention, and a certain amount of data is accumulated before being written to a "wandering" buffer in the flash memory, thereby minimizing the number of flash memory writes and reducing the incidence of flash burnout.

The device uses voice recognition algorithms and schemes that are well-known in the art. For example, voice features are encoded via an $8^{th}$ order algorithm known as Durbin's recursion, and the voice models used for training and recognition are Hidden Markov Models, which have been found to be useful in voice recognition applications.

In one embodiment of the system, a DSP1605 digital signal processor available from the Microelectronics Group of Lucent Technologies, Inc. ("Lucent Microelectronics"), is programmed and used as the digital signal processor.

BRIEF DESCRIPTION OF THE DRAWINGS

These and other objects, features, and advantages of the invention will become apparent from the detailed description below and the accompanying drawings in which.

DESCRIPTION OF THE PREFERRED EMBODIMENT

The invention is described below, with reference to detailed illustrative embodiments. It will be apparent that a system according to the invention may be embodied in a wide variety of forms. Consequently, the specific structural and functional details disclosed herein are representative and do not limit the scope of the invention.

In particular, described below is a telephone answering device that includes a voice recognition capability. As is well known in the art, the Hidden Markov Model is used for voice training and recognition; it has been found to provide better accuracy and acceptable levels of computing power than other voice recognition techniques. More information on Hidden Markov Models and other algorithms and techniques used in implementing the invention can be found in L.R. Rabiner and B.-H. Juang, *Fundamentals of Speech Recognition*, Prentice Hall, Englewood Cliffs, N.J., 1993.

Figure 1:
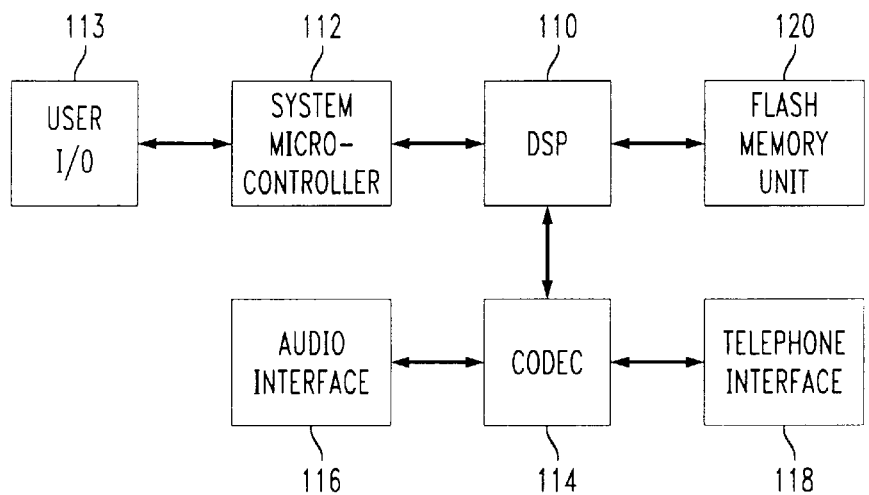
FIG. 1 is a block diagram of a telephone answering device that employs the voice recognition system and method of the invention.

Referring initially to FIG. 1, the interrelationships among the functional components of a telephone answering device according to the invention are shown. A digital signal processor (DSP) 110 is the heart of the device. The DSP 110 is coupled to a system microcontroller 112, which directs the operation of the telephone answering system by means known in the art. For example, the microcontroller 112 communicates with a user I/O interface 113, which may include such components as a digital display and push-button switches.

Also coupled to the DSP 110 is a signal coder and decoder unit (CODEC) 114. The CODEC 114 is capable of performing analog-to-digital and digital-to-analog conversions; it acts as an interface between the DSP 110, which receives and processes data in digital form, and the analog audio signals of the outside world. Accordingly, the CODEC 114 is coupled to an audio interface 116, which includes a microphone and a speaker, and a telephone interface 118, which connects the telephone answering device to the telephone system. The CODEC 114 is used to convert analog audio signals received from the audio interface 116 and the telephone interface 118 into digital data that can be processed by the DSP 110 (a process known as "sampling"); it is also used to convert the DSP's digital data back to analog audio signals when necessary for playback.

In one embodiment of the invention, the CODEC 114 and the : DSP 110 are separate integrated circuits. For example, the DSP 110 can be a chip selected from the DSP160x family of digital signal processors from Lucent Microelectronics; a preferred embodiment of the invention uses the DSP1605 chip. This chip includes 1,024 16-bit words of on-board randomaccess memory (RAM) and 16K of on-board program read-only memory (ROM) into which the telephone answering device functionality is programmed. In this embodiment, the CODEC 114 is a separate analog-to-digital and digital-to-analog converter, such as the T7513B CODEC, also available from Lucent Microelectronics. In an alternative embodiment of the invention, the CODEC 114 and the DSP 110 are incorporated into the same integrated circuit chip; examples of this configuration are found in the DSP165x family of devices from Lucent Microelectronics.

The DSP 110 is in communication with a flash memory unit 120, which is used for the long-term storage of data, such as speaker-dependent training data (e.g., voice models), as well as recorded audio for voice prompts and other information.

The flash memory unit 120, which in one embodiment of the invention has a size of four megabits (or 512K bytes), comprises the sole means of long-term data storage used by the telephone answering device. Accordingly, the flash memory unit 120 includes regions reserved for the storage of the outgoing message, incoming messages, and system-specific data (such as, for example, a message table that identifies the stored incoming messages by a time and date stamp and identifies where the messages are located within the flash memory). In addition, as discussed above, the flash memory can store voice data representative of a number of voice prompts (e.g. the numerals and words used to speak message time-and-date stamps to the user). Although such voice prompt data typically would be permanently programmed at the factory and never altered in normal use of a telephone answering system, it has been found that flash memory is sufficiently reliable that the remaining portions of a telephone answering device are likely to wear out or break before there is any trouble with the permanent voice prompts stored in flash memory. By programming the flash memory with the voice prompt data, no additional external ROM is necessary to store the voice prompts, thereby reducing chip count and potentially reducing production costs.

If power is removed from the telephone answering device, the system-specific data can be used to reconstruct any real-time data necessary for the operation of the system.

Figure 2:
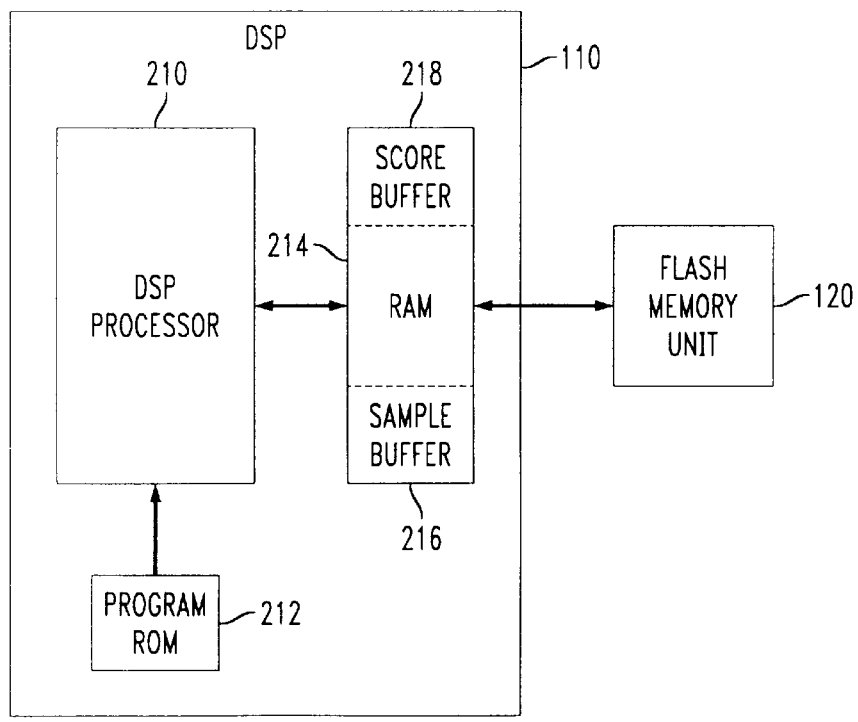
FIG. 2 is a block diagram of the internal structure of a digital signal processor used in the telephone answering device of FIG. 1.
Figure 3:
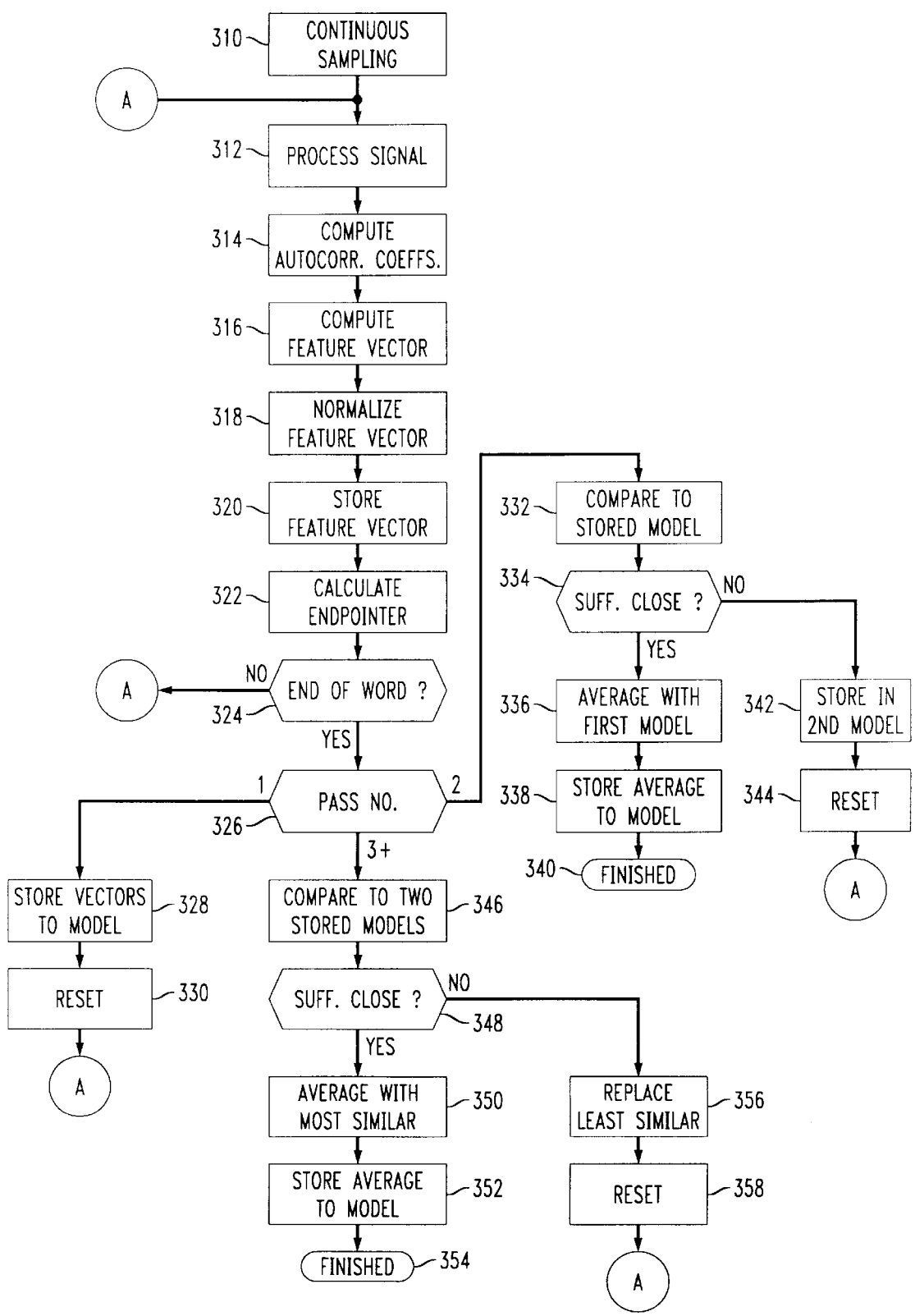
FIG. 3 is a flowchart illustrating the steps performed in speaker-dependent voice training according to the invention.
Figure 4:
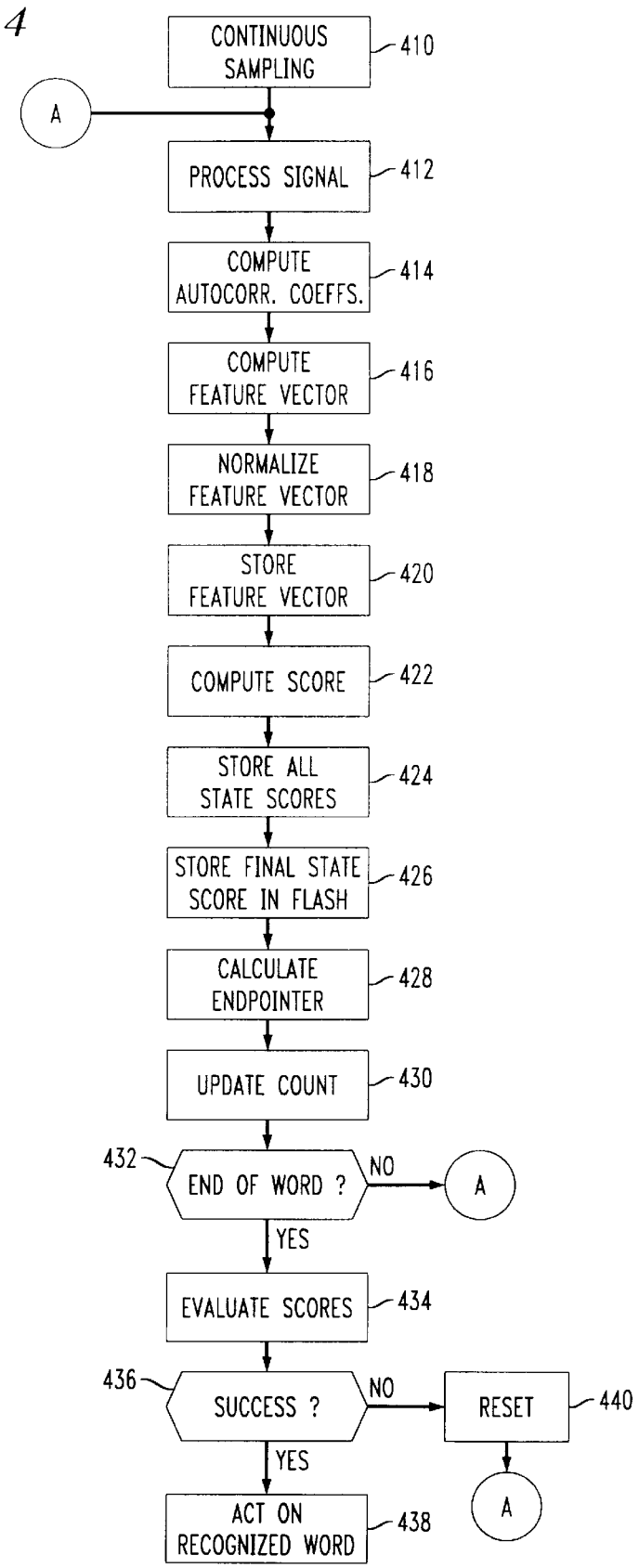
FIG. 4 is a flowchart illustrating the steps performed in voice recognition according to the invention.

Several internal features of the DSP 110 are important and are illustrated in FIG. 2. The DSP 110 has an internal DSP processor 210. The processor 210 is coupled to a program ROM 212, which stores the program code necessary to implement the functionality of the telephone answering device, including the training and recognition operations that will be discussed in further detail below, in conjunction with the flowcharts of FIGS. 3 and 4.

The processor 210 is also coupled to internal RAM 214. The Lucent DSP1605 device has 1,024 words of RAM 214. A portion of the RAM 214 is used for the storage of variables and other data temporarily used by the program stored in the ROM 212. A sample buffer 216 is also allocated within the RAM 214. The sample buffer 216 is used to hold the raw recorded digital sound data received from the CODEC 114 before and during processing. The DSP processor 210 operates on the data in the sample buffer 216 and accumulates its output before writing it to the flash memory unit 120. A score buffer 218, also allocated from the internal RAM 214, is used during the voice recognition operation to keep track of the recognition scores for each word in the device's vocabulary. The functions performed in these operations will be discussed in further detail below.

As discussed above, a training operation is necessary before a speaker-dependent voice recognition system can be used by any particular user. The process performed in the training operation, including the interaction between the DSP 110 and the flash memory unit 120 during the training operation, will now be considered in conjunction with the flowchart of FIG. 3.

Training is accomplished by having a user speak each word desired to be recognized at least twice. Optionally, at the beginning of each training pass, the user can be prompted to speak the desired word by programming the DSP 110 to read certain voice prompts from the flash memory unit 120. The system records each utterance, and if two sequential recordings are sufficiently similar to each other, then a model representing the average sound of the spoken word is stored for later use in the voice recognition operation.

Initially, the voice recognition system begins sampling audio continuously into a sample buffer (step 310). Preferably, the sample buffer is maintained in the on-board RAM within the DSP 110. In a preferred embodiment, sampling is performed at a rate of 8 kHz, or 8,000 samples per second. Each sample has 8-bit resolution, and is encoded in $\mu$-law format by the codec 114. As is well known in the art, $\mu$-law quantization is a logarithmic quantization scheme; 8 bits of $\mu$-law-encoded information are able to provide approximately the same dynamic range as 14-bit linear encoding.

Sampling is performed into two 160-sample frame buffers in the on-board RAM. Together, these two frame buffers make up the sample buffer. Accordingly, at an 8 kHz sample rate, each frame buffer holds 20 milliseconds (or $\frac{1}{50}$ second) of audio information. Stated another way, the frame rate is 50 Hz. Each successive frame begins upon completion of the prior frame; the frames are "touching" but do not overlap. While sampling is being performed into one frame buffer, the other frame buffer is asynchronously being processed by the invention, as will be discussed in further detail below.

After one frame buffer is full of samples, processing can begin. Initially, the samples in the frame buffer are signal-processed to pre-emphasize high frequencies and to "window" the frame (step 312). In a preferred embodiment of the invention, a trapezoidal window with 20-sample rise and fall times is employed. This is done to ensure that the greatest contribution to the signal is made by the samples at the center of the frame, and not the boundary samples near the preceding and following frames. At that time, autocorrelation coefficients are calculated for the frame (step 314). As is known in the art, the autocorrelation coefficients represent a time-based frequency spectrum for the samples in the frame.

The autocorrelation coefficients are then converted to a feature vector (step 316). This is performed via an $8^{th}$ order Linear Predictive Coding (LPC) technique known as Durbin's recursion, which is known in the art. Resulting from this manipulation is a set of nine values known as "cepstral" coefficients. A first-order term is converted to a log energy coefficient, which represents the energy contained in the signal. The remaining eight terms are also part of the feature vector, as are seven additional terms, which are weighted delta values from the previous frame's feature vector. Accordingly, the feature vector for a single frame comprises sixteen terms: one log energy, eight LPC or cepstral terms, and seven delta cepstral terms.

The terms of the feature vector are then normalized based on the values of preceding feature vectors (step 318). This not only compensates for variations in signal amplitude, but also for signal variations (for example, based on whether the speaker is speaking directly into the apparatus or indirectly through a telephone connection). This normalization process is well-known in the art and is used in many voice recognition techniques.

In a system according to the present invention, the entire feature vector is then stored into a feature buffer in the flash memory 120 (step 320). Because flash memory is being used, rather than static RAM, for example, it is useful to store the entire feature vector (comprising sixteen values) at one time, rather than piecemeal. This then serves to reduce the incidence of flash burnout.

After the feature vector is computed, normalized, and stored, the endpoint is calculated (step 322). The endpoint is calculated based on the value of the feature vector just calculated, as well as the feature vectors corresponding to preceding frames. The endpoint, which indicates where a particular utterance or word ends, is calculated by means known in the art. It should be noted that the endpoint calculation algorithm usually must look back to determine where an utterance ends; it usually cannot be determined by looking only at a single feature vector. Accordingly, an utterance may be determined to have ended several frames after it actually ended.

If the endpoint does not indicate that an end-of-word has been reached (step 324), then the algorithm repeats and additional frames are processed (beginning at step 312). Otherwise, the pass number is determined (step 326), and the actions to follow depend on whether this is the first, second, or third (or greater) pass through the algorithm.

If this is the first pass through the algorithm, the normalized feature vectors corresponding to the spoken word are stored to a word model in the flash memory (step 328). The algorithm is then reset (step 330), and a second pass is made through the algorithm.

On the second pass through the algorithm, the newly computed normalized feature vectors are compared to the word model stored on the first pass (step 332). If they are sufficiently similar (step 334), then the two passes are averaged (step 336) and stored in the word model (step 338). The training algorithm is then finished for that word (step 340). It should be noted that there is a separate word model stored in the flash memory unit 120 for each word in the device's vocabulary.

If the two passes are not sufficiently similar (step 334), then the newly computed feature vectors are stored in a second word model (step 342), the algorithm is reset (step 344), and a third pass is made.

On the third pass, the newly computed normalized feature vectors are compared to both vocabulary models stored on the first and second passes (step 346). If the new feature vectors are sufficiently similar to either of the two prior vocabulary models (step 348), then the new feature vectors are averaged with those from the most similar word model (step 350), and the average is stored in the word model (step 352). Training is then complete for that word (step 354). If the new feature vectors match neither prior pass, then the new feature vectors are written to replace the least similar word model (step 356), the algorithm is reset (step 358), and another pass is made.

At the completion of this training algorithm, one word model comprising an average of at least two passes through the algorithm is stored in the flash memory 120. In a preferred embodiment of the invention, feature vector variances between the two passes are also stored in the word model for later use in the recognition process. By using three or more passes, it can be ensured that at least two utterances of the same word are sufficiently similar in sound, so that sufficient meaningful statistical information for the voice model can be derived therefrom.

The foregoing training operation is repeated for each word in the system's operative vocabulary. These words may comprise a number of fixed commands, such as "erase messages," "play messages," and the numerical digits for use in a telephone answering device, and may also include a number of customized utterances for use in an automatic telephone dialing device. For example, in the latter case, the user might wish to train individuals' names, so that the device will dial properly when it recognizes one of the names.

After training is completed, a voice recognition operation can be performed. The process performed in the recognition operation, including the interaction between the DSP 110 and the flash memory unit 120 during the recognition operation, will now be considered in conjunction with the flowchart of FIG. 4.

Again, the voice recognition system begins sampling continuously into a sample buffer (step 410). Sampling is again performed into two 160-sample frame buffers in the on-board RAM. While sampling is being performed into one frame buffer, the other frame buffer is asynchronously being processed for recognition by the invention, as will be discussed in further detail below.

After one frame buffer is full of samples, processing can begin. Initially, the samples in the frame buffer are signal-processed to pre-emphasize high frequencies and to "window" the frame (step 412). Then, autocorrelation coefficients are calculated for the frame (step 414). The autocorrelation coefficients are then converted to a feature vector (step 416) via the Durbin's recursion technique discussed above. The sixteen terms of the feature vector are then normalized based on the values of preceding feature vectors (step 418). In a system according to the present invention, the entire feature vector is then stored into a feature buffer in the flash memory 120 (step 420). Again, storing the entire feature vector at once reduces the incidence of flash burnout.

After a feature vector is calculated, the feature vector is then scored against all of the word models in the device's vocabulary (step 422). In a preferred embodiment, this is accomplished by the Viterbi algorithm, which is well known in the art. The result of this processing is a set of scores, one for each Hidden Markov Model state in each vocabulary word. For example, if a device is trained to recognize 25 different vocabulary words, and each word model has eight states, then there will be a total of 200 scores at the conclusion of the Viterbi scoring step. These scores are all temporarily stored in the score buffer 218 in the DSP's internal RAM 214 (step 424). The scores corresponding to the final state score for each vocabulary word (in the example, a total of 25 scores) are further stored in a "traceback buffer" in the flash memory unit 120 (step 426).

After the feature vector is computed, normalized, stored, and scored, the endpoint is calculated (step 428). The endpoint is calculated based on the value of the feature vector just calculated, as well as the feature vectors corresponding to preceding frames. The endpoint, which indicates where a particular utterance or word ends, is calculated by means known in the art. A count is also generated (step 430); it corresponds to the number of frames that have been processed since the last endpoint was located. The count corresponds roughly to the length of the current utterance.

It should be noted that the endpoint calculation algorithm usually must look back to determine where an utterance ends; it usually cannot be determined by looking only at a single feature vector. Accordingly, an utterance may be determined to have ended several frames after it actually ended. For this reason, the traceback buffer described above is used to keep track of previous model-ending scores; the model-ending scores corresponding to the endpoint are checked to determine whether an utterance has been recognized. Hence, once the endpointer algorithm determines that and end-of-word has previously been reached (step 432), the scores in the traceback buffer at the point identified by the endpoint are evaluated (step 434).

If the score for one word model in the device's vocabulary exceeds a recognition threshold and also exceeds the scores for all other words in the vocabulary, the word corresponding to that model has been successfully recognized (step 436).

It should be noted that the invention is capable of recognizing a sequence of words rather than individually spoken words. The former is accomplished by recognizing the last word in a sequence, then moving back through the counts and scores stored in the traceback buffer to recognize the prior words. In either case, once recognition is complete, the DSP 110 or the microcontroller 112 is caused to act as specified by the recognized word (step 438), which can be either a command or data input from the user. If no score exceeds the recognition threshold, then the recognition operation is reset (step 440), and recognition processing continues. Optionally, at this time, an indication can be made to the user that the prior word was not recognized.

As discussed above, the present invention employs several means to reduce the incidence of flash memory burnout. For example, during training, a frame of sampled audio data is processed completely until its corresponding feature vector has been entirely calculated; individual portions of each feature vector are not written to flash memory until that time. Moreover, word models are not written to flash memory until a complete pass has been made through the recognition algorithm. During the recognition operation, similarly, feature vectors are not written piecemeal, and only final state scores for each frame are written to the flash memory.

An additional buffer manipulation scheme is further used to reduce flash burnout effects. As discussed above, a four megabit flash memory device is typically used for a telephone answering device that can incorporate both digital voice storage and voice recognition capabilities. However, only a small fraction of the flash memory unit 120 need be committed to voice recognition. Specifically, out of 512K bytes of storage available in a four megabit device, it has been found that only approximately 64K bytes are necessary for all of the buffers, variables, and model storage necessary in a voice recognition system according to the invention. However, as the 64K region is frequently written to by both the training and recognition operations, this segment of the flash memory unit 120 will frequently be subject to burnout effects after only a relatively short period of usage.

Accordingly, a scheme has been devised to minimize the impact of voice training and recognition writes on a buffer chosen from a larger flash memory unit. This scheme is depicted schematically in FIG. 5.

Figure 5A:
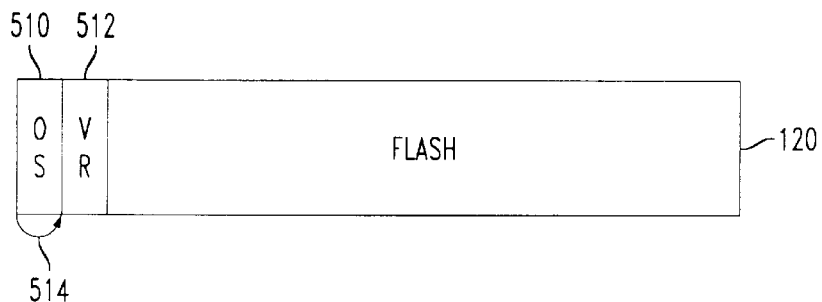
FIG. 5 is a block diagram showing a wandering buffer employed to reduce the incidence of flash memory burnout according to the invention.
Figure 5B:
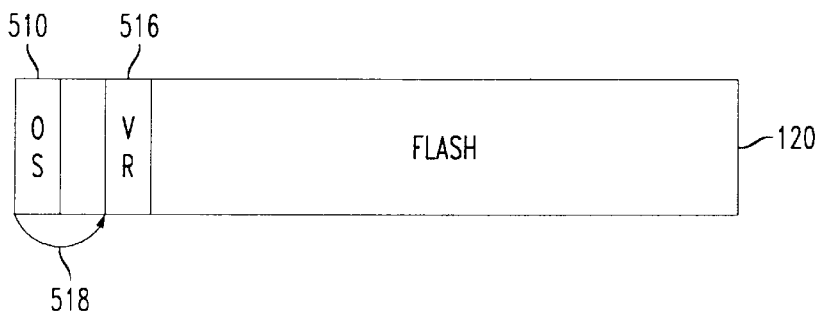

In FIG. 5, two instances of a flash memory unit 120 are shown. In the first (FIG. 5a), the flash memory unit 120 maintains an operating system region 510 and a voice recognition region 512. The operating system region 510 maintains critical system data used by the telephone answering device or other apparatus, including variables which specify the location of other data structures throughout the flash memory unit 120. When a telephone answering device or other apparatus is first initialized, the voice recognition region 512, which contains all buffers, models, and other data necessary for voice recognition operations, is located in a portion of the flash memory unit 120 immediately following the operating system region 510. The remaining portion of the flash memory unit 120 can be used to store other data, such as outgoing voice prompts and incoming messages. A consistently-located pointer 514 in the operating system region 510 specifies the location of the voice recognition region.

After the system has been operated for some time, the voice recognition region is relocated by the invention. The time after which this is performed can vary from several hours to several months; it is merely important that the relocation operation not disrupt the ordinary operation of the telephone answering device (or other apparatus), and the number of write operations to the voice recognition region 512 must not have already caused a burnout of that region.

Figure 6:
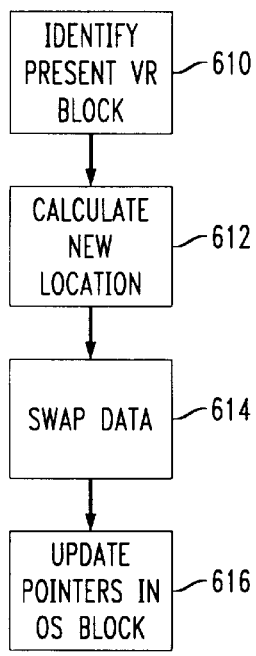
FIG. 6 is a flowchart illustrating how voice training and recognition buffers are moved and tracked by the invention.

Accordingly, in the second instance of the flash memory unit 120 (FIG. 5b), a second voice recognition region 516 has been allocated to replace the first voice recognition region 512. A new pointer 518 identifies the location of the second voice recognition region 516. This is performed according to the algorithm set forth in FIG. 6.

Initially, at an idle time after a specified number of write operations have been performed or after a specified elapsed time, the present voice recognition block or region is identified (step 610). Then, a new location for the voice recognition region is calculated (step 612). The region is chosen such that there is no page-overlap between the prior region and the new region. This ensures that writes to the new region will not contribute to burnout of the old region.

Data in the old location is swapped (step 614) with data in the new location. It should be noted that the new location need not be free or empty; it may already contain other data not used in the voice recognition operation. Finally, pointers in the operating system region or block are updated (step 616) to reflect the locations of the new voice recognition region, as well as the new location for the data that was previously occupying the new voice recognition region.

By employing this "wandering buffer" technique, it has been found that a flash memory-based telephone answering device or other consumer device featuring voice recognition capability can have a lifespan of ten or more years, which is considered to be an acceptable lifespan for a relatively inexpensive consumer device.

The other operations performed by a telephone answering device according to the invention are traditional in nature. See, for example, the Product Note for the Lucent LJ30 NAND FlashTAD telephone answering device subsystem, which is incorporated by reference as though set forth in full herein. The LJ30 is capable of using certain standard types of flash memory for digital voice storage, but in its standard form is not capable of the voice recognition operations discussed herein.

It should be observed that while the foregoing detailed description of various embodiments of the present invention is set forth in some detail, the invention is not limited to those details and a digital voice recognition device made according to the invention can differ from the disclosed embodiments in numerous ways. In particular, it will be appreciated that embodiments of the present invention may be employed in many different applications to recognize spoken commands.

Moreover, while certain particular parts from Lucent Microelectronics are disclosed as being operable in a system according to the invention, other electronic components, including custom devices, having the essential attributes discussed above also may function as described. Specifically, while various components have been described as performing certain functions in the invention, it should be noted that these functional descriptions are illustrative only, and a device performing the same functions can be implemented in a different way, by either physically combining or separating the functions described, or by adding additional functions. In an alternative embodiment of the invention, for example, the DSP 110, the microcontroller 112, the CODEC 114 can be combined into a single chip.

Hence, the appropriate scope hereof is deemed to be in accordance with the claims as set forth below.

What is claimed is:

1. A voice recognition system, comprising:
a digital signal processor having internal RAM; and
a flash memory unit having a voice recognition region;
wherein the digital signal processor is configured to (a) buffer intermediate results in the internal RAM before writing data to the voice recognition region, and (b) move the voice recognition region from a present address region within the flash memory to a next address region within the flash memory in response to a predefined condition.

2. The voice recognition system of claim 1, wherein the condition comprises passing of a predetermined period of time.

3. The voice recognition system of claim 1, wherein the condition comprises the execution of a predetermined number of memory writes.

4. The voice recognition system of claim 1, wherein the digital signal processor is further configured to perform a training operation and a recognition operation.

5. The voice recognition system of claim 4, wherein the intermediate results comprise feature vectors and word models from the training operation.

6. The voice recognition system of claim 4, wherein the intermediate results comprise feature vectors and model scores from the recognition operation.

7. The voice recognition system of claim 1, further comprising:
telephone interface suitable for connection to a telephone system; and
a coder and decoder unit connected between said telephone interface and said digital signal processor.

8. The voice recognition system of claim 7, further comprising an audio interface connected to said coder and decoder unit.

9. The voice recognition system of claim 8, further comprising:
a system microcontroller connected to said digital signal processor and having a user interface, said microcontroller being configured to operate said voice recognition system as a telephone answering device.

10. The voice recognition system of claim 1, wherein the next address region does not overlap the first address region.

11. The voice recognition system of claim 1, wherein the flash memory unit has an address space substantially greater than the voice recognition region.

12. A voice recognition system comprising:
a digital signal processor having internal RAM;
a flash memory unit having a voice recognition region; and
means for moving the voice recognition region within the flash memory unit from a present location to a next location in response to a predetermined condition.

13. A method for reducing the incidence of flash burnout in a voice recognition system using a flash memory unit, comprising the steps of:
- allocating a voice recognition region within a first address range in the flash memory unit;
- directing memory writes by the voice recognition system to the voice recognition region;
- awaiting an idle time period during which the voice recognition system will not be used; and
- moving the voice recognition region from the first address range to a second address range in the flash memory unit.

14. The method of claim 13, wherein the first and second address ranges do not overlap.

15. The method of claim 13, wherein the awaiting and moving steps are performed in response to a predefined condition.

16. The method of claim 15, wherein the condition comprises the passing of a predetermined period of time.

17. The method of claim 15, wherein the condition comprises the execution of a predetermined number of writes to the voice recognition region.

* * * * *

UNITED STATES PATENT AND TRADEMARK OFFICE
CERTIFICATE OF CORRECTION

PATENT NO.    : 6,044,346
DATED         : March 28, 2000
INVENTOR(S)   : Syed S. ALI and Stephen C. GLINSKI It is certified that errors appear in the above-identified patent and that said Letters Patent is hereby corrected as shown below:

Title Page, [75], Inventor Syed S. Ali, change "Green Brook, NJ " to -- Allentown, PA--.

Signed and Sealed this

Twentieth Day of March, 2001

*Attest:*

NICHOLAS P. GODICI

*Attesting Officer*   *Acting Director of the United States Patent and Trademark Office*